United States Patent [19]

Hegener

[11] Patent Number: 5,098,106
[45] Date of Patent: Mar. 24, 1992

[54] CHESS TEACHING COMPUTER

[75] Inventor: Manfred Hegener, Munich, Fed. Rep. of Germany

[73] Assignee: Hegener & Glaser AG, Munich, Fed. Rep. of Germany

[21] Appl. No.: 618,515

[22] Filed: Nov. 21, 1990

Related U.S. Application Data

[63] Continuation of Ser. No. 285,445, Dec. 16, 1988, abandoned.

[30] Foreign Application Priority Data

Dec. 18, 1987 [DE] Fed. Rep. of Germany ....... 8716732

[51] Int. Cl.$^5$ .............................................. A63F 3/02
[52] U.S. Cl. .................... 273/238; 434/128; 273/239
[58] Field of Search ............... 273/237, 238, 239, 1 E; 434/128

[56] References Cited

U.S. PATENT DOCUMENTS

| | | | |
|---|---|---|---|
| 4,019,745 | 4/1977 | Mustelier | 273/237 |
| 4,073,067 | 2/1978 | Beach | 434/128 |
| 4,235,442 | 11/1980 | Nelson | 273/237 |
| 4,541,633 | 9/1985 | Newbill | 273/238 |

FOREIGN PATENT DOCUMENTS

| | | | |
|---|---|---|---|
| 2928544 | 2/1981 | Fed. Rep. of Germany | 273/237 |
| 7323825 | 6/1973 | France | 273/238 |
| 0820867 | 4/1981 | U.S.S.R. | 434/128 |

Primary Examiner—Edward M. Coven
Assistant Examiner—Jessica Harrison
Attorney, Agent, or Firm—Finnegan, Henderson, Farabow, Garrett and Dunner

[57] ABSTRACT

A playing device for learning how to play chess designed in the form of a chess teaching computer comprises a housing having on its top a board divided into sixty-four squares of equal size and taking up in its interior a chess computer whose signal inputs and outputs are connected with the individual squares. The improved arrangement is such that the chess computer (5) is connected with an additional program memory means (9) which is also disposed within the housing (2) and contains a plurality of practice positions (11) in a stored form, a switch (14) is disposed on the side beside the board (3) for switching over the electrical connection between the individual squares (4) each having a control switch (7) and the chess computer (5) to the program memory means (9), and the leads (12) of the practice positions (11) contained in the program memory means (9) are each connected with a control switch (7) of the squares (4).

3 Claims, 1 Drawing Sheet

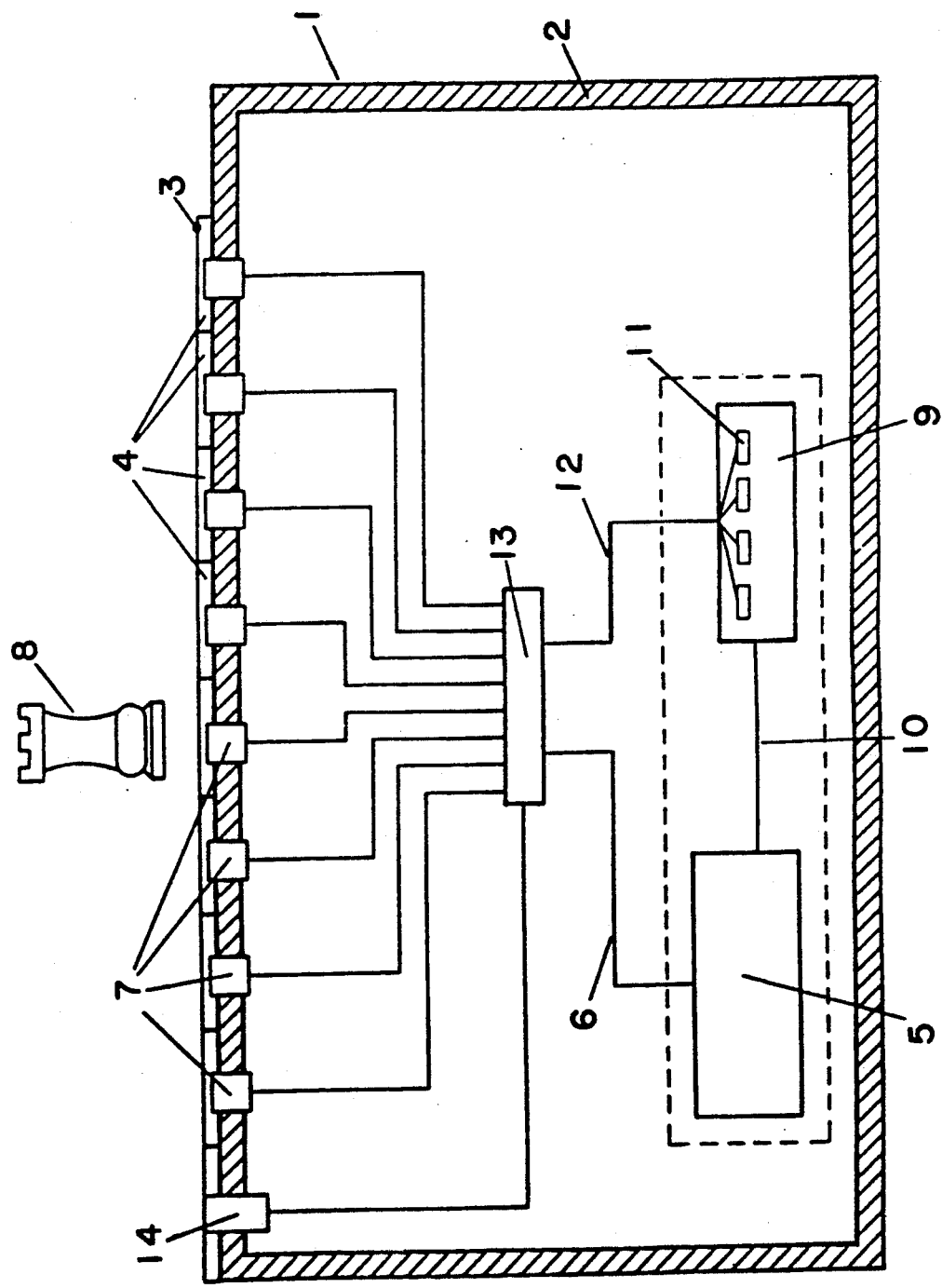

CHESS TEACHING COMPUTER

This application is a continuation of application Ser. No. 07/285,445, filed Dec. 16, 1988, now abandoned.

BACKGROUND OF THE INVENTION

1. Field of the Invention

This invention relates to a playing device for learning chess designed in the form of a chess teaching computer, comprising a housing having on its top a board divided into sixty-four squares of equal size and taking up in its interior a chess computer whose signal inputs and outputs are connected to the various squares.

2. Discussion of Related Art

With a known playing device of this kind designed in the form of a chess teaching computer, it is possible to call up, in addition to the chess computer playing operation itself, special playing practice positions for learning how to play chess. The disadvantage, however, is that each individual practice position must be called up by a special key disposed at the side on one edge of the board. This enlarges the keyboard of the playing device in undesirable fashion, or limits the availability of the keys whose number is predetermined. In addition, the known playing device allows for only a small number of practice positions to be called up, so that the function of this device as a chess teaching computer is limited and inefficient.

SUMMARY OF THE INVENTION

It is therefore an object of this invention to eliminate the aforesaid disadvantages by designing the playing device of the generic type in such a way that a great number of practice positions can be called up or electronically activated for learning how to play chess, with little circuit complexity and constructional effort.

These and other objects will become apparent by referring to the present invention.

The inventively designed playing device is based on the idea in terms of circuit technology of providing an additional program memory means in which a plurality of practice positions are stored. These practice positions are associated with the individual squares of the board in such a way that, by pressing a certain square or activating the corresponding control switch, they can be called up and thus loaded into the memory of the chess computer, after the corresponding squares, which are otherwise switched by control switches to input the various chess moves, have been switched over to reach out the practice positions stored in the program memory means.

For this purpose, the playing device according to the invention is specifically- designed in such a way that the chess computer is provided with an additional program memory means. The latter is also disposed within the housing and contains a plurality of practice positions in a stored form. On the side, beside the board, there is a switch for changing over the electrical connection between the individual squares each having a control switch, and the chess computer to the program memory means. Furthermore, the individual practice positions contained in the program memory means, or their leads, are each connected with a control switch for the squares.

This circuit and construction design provides the substantial advantage that no separate call-up key is required for each individual practice position stored in the program memory means. Instead, little circuit complexity is required to make available or electronically activate, and thus call up, a great number of practice positions.

One obtains a particularly large variety of practice positions and thus a desirably large selection when, according to an advantageous development of the invention, the program memory means has sixty-four practice positions, or a corresponding number of leads, and each of the sixty-four control switches of the chessboard is connected with one of the respective leads.

If the invention playing device, which can also be used in the usual way as a normal chess computer, is to be switched over from normal chess computer playing operation to playing operation as a chess teaching computer, it is merely necessary to activate the changeover switch provided on the side beside the board or at some other appropriate place. This switches over the various control switches of the sixty-four squares, which are used in normal chess computer playing operation to input the various moves, and prepares them for reading out the practice positions stored in the program memory means. One then presses any one of the sixty-four squares of the chessboard, so that the thereby activated control switch causes the connection to be established with the corresponding practice position in the program memory means and this position is loaded from the program memory into the chess computer.

BRIEF DESCRIPTION OF THE DRAWINGS

The single drawing schematically shows the inventive playing device by a corresponding block diagram.

DESCRIPTION OF PREFERRED EMBODIMENT

As shown in the drawing, a playing device 1 is provided which is designed as a chess teaching computer and has a housing 2. This housing is provided on its top with a board 3 attached thereto in some suitable fashion and divided in the usual way into sixty-four squares 4 of equal size.

Within housing 2 there is a chess computer 5 designed in the known way as a data processing circuit and connected via a corresponding number of lines 6 with each individual square 4 of chessboard 3.

As indicated schematically in the drawing, a control switch 7 is provided between each square 4 of chessboard 1 and the associated connection line 6, said control switch 7 being designed as a press or sensor switch and being activated by a chess piece 8 placed with a certain pressure on square 4 to establish the electrical connection between this specific square 4 and chess computer 5, or feed a corresponding signal to the latter.

As can also be seen, an additional program memory means 9 is provided within housing 2, being connected via a line 10 with chess computer 5 and, in the embodiment shown, containing sixty-four stored playing circuit units 11 each corresponding to a practice position or problem.

Individual circuit units 11, or their leads 12, are each connected to a control switch 7 of squares 4. The arrangement or circuit is such that between leads 12 and connection lines 6 there is a switching means 13 which can be optionally operated by means of a changeover switch 14 in such a way as to connect either circuit units 11 (or their leads 12) of program memory means 9, or chess computer 5 (or its lines 6), with control switches 7 of squares 4. Changeover switch 14 is disposed on the side on one edge of board 3 and attached to the top of housing 1.

As indicated by the broken line in the drawing, chess computer 5 and program memory 9 containing circuit units 11 or the practice problems are formed as one unit (EPROM) in a practical realization of described playing device 1.

It is of course possible to modify described playing device 1 in such a way that practice problem program memory 9 also contains more than sixty-four practice positions 11, for example one hundred and twenty-eight, or any other multiple of the originally stored number. In this case, squares 4, or their control switches 7, can be allocated two or more functions, whereby any specific square control switch 7 can be used to change over to the corresponding problem or memory areas 1–64, 65–128, etc.

I claim:

1. A chess playing device for inputting selected ones of a plurality of possible moves to a chess computer, said device comprising:

a chess board assembly having a chess playing surface with sixty-four playing piece squares of substantially equal size;

a control switching means disposed in each of the squares and being operative in response to a distinctive placing of a chess piece in the corresponding square;

a chess computer means having a first input for receiving data corresponding to practice position data and a second input for receiving data corresponding to a player piece occupation of the squares;

a program memory means having a plurality of stored chess practice positions at least corresponding to the number of squares, the program memory means having an output connected to the first input of the chess computer means and operative when selectively activated for loading a corresponding one of the stored practice positions into the chess computer;

changeover switching means manually operable in the alternative to a first and second condition mounted to the chess board assembly; and circuit means governed by the changeover switching means for connecting each of the control switching means to the program memory means for activating the program memory means to load data corresponding to a respective chess practice position from the program memory means into the chess computer means in response to the operation of a corresponding control switching means at times when the changeover switching means is in the first condition and governed by the changeover switching means for connecting each of the control switching means to the second input of the chess computer means for receiving data corresponding to the player piece occupation of the squares, at times when the changeover switching means is in the second condition.

2. The chess playing device of claim 1 wherein the chess board assembly is a housing having a top surface and contains the chess computer means, the circuit means, and the memory means; and the chess playing surface constitutes the top surface of the housing.

3. The chess playing device of claim 1 wherein the chess computer means and the program memory means are individual wire connected units.

* * * * *